US012737500B2

(12) United States Patent
Espinoza et al.

(10) Patent No.: US 12,737,500 B2
(45) **Date of Patent: *Sep. 15, 2026**

(54) AGENT FUNCTIONALITY EXTENSIONS USING SURVEYORS

(71) Applicant: Halcyon Tech, Inc., Austin, TX (US)

(72) Inventors: Alejandro Espinoza, San Marcos, CA (US); Robert Bushner, Homeland, CA (US); Matthew Gosline, Austin, TX (US); Kristen Lamb, Austin, TX (US); Seagen Levites, Oregon City, OR (US); Clark Lindsey, Loudon, TN (US); Jonathan Miller, Poway, CA (US); Ryan Smith, Austin, TX (US); Vu Ta, Fellbach (DE)

(73) Assignee: Halcyon Tech, Inc., Austin, TX (US)

( * ) Notice: Subject to any disclaimer, the term of this patent is extended or adjusted under 35 U.S.C. 154(b) by 77 days.

This patent is subject to a terminal disclaimer.

(21) Appl. No.: 19/067,641

(22) Filed: Feb. 28, 2025

(65) Prior Publication Data

US 2026/0134151 A1 May 14, 2026

Related U.S. Application Data

(63) Continuation of application No. 18/948,343, filed on Nov. 14, 2024, now Pat. No. 12,277,251.

(51) Int. Cl.

| | |
|---|---|
| ***G06F 21/60*** | (2013.01) |
| ***G06F 21/54*** | (2013.01) |
| ***G06F 21/56*** | (2013.01) |
| ***G06F 21/62*** | (2013.01) |
| ***H04L 9/40*** | (2022.01) |

(52) U.S. Cl.
CPC ........ *G06F 21/6272* (2013.01); *G06F 21/565* (2013.01); *G06F 21/566* (2013.01)

(58) Field of Classification Search
CPC . H04L 9/40; G06F 21/60; G06F 21/62; G06F 21/56; G06F 21/54; G06F 21/6272; G06F 21/565; G06F 21/566
See application file for complete search history.

(56) References Cited

U.S. PATENT DOCUMENTS

| | | | | |
|---|---|---|---|---|
| 2018/0114020 | A1* | 4/2018 | Hirschberg | G06F 21/566 |
| 2019/0205533 | A1* | 7/2019 | Diehl | G06F 21/567 |
| 2020/0356686 | A1* | 11/2020 | Vijayvargiya | G06F 21/568 |

FOREIGN PATENT DOCUMENTS

| | | | | |
|---|---|---|---|---|
| WO | WO-2024112501 A1 * | 5/2024 | | G06F 16/2425 |

* cited by examiner

*Primary Examiner* — Jayesh M Jhaveri
(74) *Attorney, Agent, or Firm* — Jones Day

(57) ABSTRACT

Information characterizing a security event is received from an agent executing on an endpoint computing device. The received information identifies a plurality of files encrypted as part of a ransomware attack and key material used when encrypting each of the files. Based on the received information, a surveyor package is generated which includes decryptor logic to decrypt at least a portion of the files. The surveyor package is deployed to the agent so that it can be unpacked and executed to decrypt at least a portion of the files. Once these files are decrypted, then can be transported to a safe computing environment Related apparatus, systems, techniques and articles are also described.

22 Claims, 5 Drawing Sheets

AGENT FUNCTIONALITY EXTENSIONS USING SURVEYORS

RELATED APPLICATION

The current application is a continuation of U.S. patent application Ser. No. 18/948,343 filed on Nov. 14, 2024, the contents of which are hereby fully incorporated by reference.

TECHNICAL FIELD

The subject matter described herein relates to techniques for deploying and selectively updating agents executing on distributed endpoints to counter undesired system behavior such as to thwart a ransomware attack.

BACKGROUND

Cybersecurity threats are designed to evade modern security tools by delivering or otherwise executing code within a computing environment which, when executed, implement various malicious activities. Given the increasing sophistication of these threats, security tools within the computing environment can be bypassed resulting in problematic code being inserted, accessed, stored, or executed. In order to counter such activities, agents can be executed on endpoints to monitor and report events that are indicative of a security breach. Given the complexities associated with emerging cyber threats, frequent and sophisticated messaging capabilities responsive to these monitored events are needed.

SUMMARY

In a first aspect, a request is received to deploy a surveyor to an agent executing on an endpoint computing device. In response to the request, a surveyor package is generated which comprises an executable for updating the agent to address a security event and metadata characterizing the surveyor package. The surveyor package is then deployed to the agent so it can unpack the surveyor package to access and execute the executable to address the security event.

Information characterizing encrypted files can be received by the agent executing on the endpoint computing device. The encrypted files can be stored on the endpoint computing device executing the agent and/or by a second endpoint computing device different than the endpoint computing device executing the agent.

The received information can include a list of files which were encrypted and/or information characterizing key material used in encrypting each of the encrypted files in the list of files.

Decryptor logic can be generated based on the list of files and the key materials used for each of the encrypted files in the list of files. The executable forms part of the surveyor package can be based on the generated decryptor logic.

The security event can take varying forms including, for example, a ransomware attack.

In an interrelated aspect, information characterizing a security event is received from an agent executing on an endpoint computing device. The received information identifies a plurality of files encrypted as part of a ransomware attack and key material used when encrypting each of the files. Based on the received information, a surveyor package is generated which includes decryptor logic to decrypt at least a portion of the files. The surveyor package is deployed to the agent so that it can be unpacked and executed to decrypt at least a portion of the files. Once these files are decrypted, then can be transported to a safe computing environment (i.e., a computing environment external to the computing environment which was the subject of the security event).

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides for less costly techniques (in terms of computing resources) for updating agents executing on endpoints to address security events such as ransomware attacks.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to a techniques for deploying and updating agents executing on various endpoints (i.e., monitored computing devices) to more effectively address or otherwise thwart security events such as ransomware or activities otherwise which causing monitored systems (i.e., endpoints having an agent installed thereon, etc.) to operate in an undesired manner.

Figure 1:
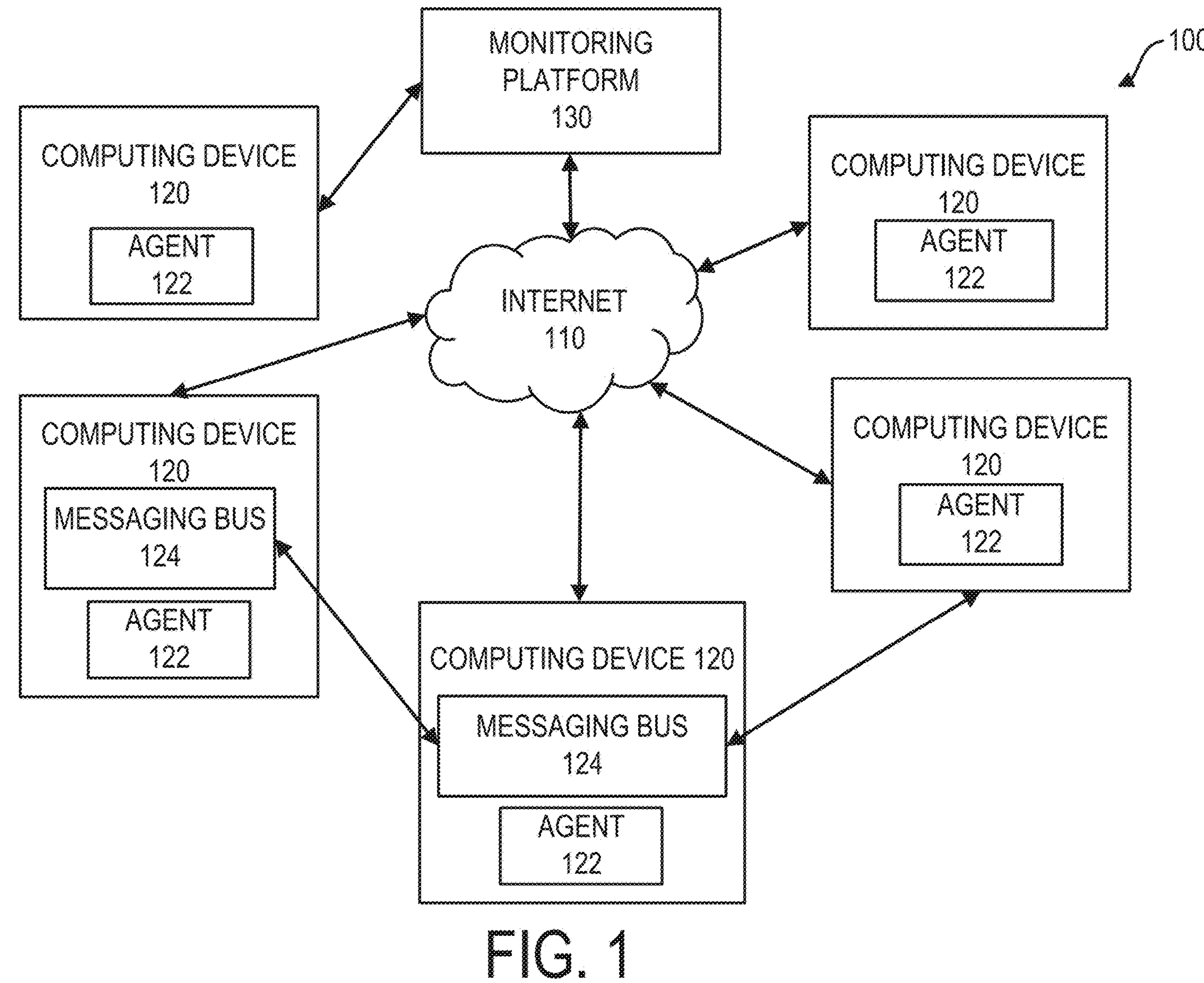
FIG. 1 is an architecture diagram illustrating aspects of a security monitoring platform in which agents are installed on computing devices.

FIG. 1 is an architecture diagram 100 in which a monitoring platform 130 can monitor and protect a plurality of computing devices 120 (e.g., endpoints, etc.) by way of the Internet 110 or by way of direct connections (e.g., on-premise protection, etc.). Each of the monitored computing device 120 can include at least one agent 122 executing thereon which can be used to locally analyze security events and/or to transmit data to the monitoring platform 130 which characterize security events. In some cases, the computing device can execute a messaging bus 124 which selectively processes and transmits messages characterizing security events. The messaging bus 124 can generate, process, and transmit messages that are derived from security events generated or identified by the agents 122 and/or from other sources executing on the corresponding computing device 120 or a peer computing device 120. Further details regarding the messaging bus can be found in U.S. patent application Ser. No. 18/744,564 filed on Jun. 14, 2024, the contents of which are hereby fully incorporated by reference.

In some cases, the agents 122 are installed after a security event such as a ransomware attack. With this example, ransomware has already infiltrated at least one of the computing devices 120 and encrypted certain files for which a decryption key will be provided in exchange for a ransomware payment. In such cases, the agent 122 can be installed on the computing device(s) 120 to facilitate remediation of the security event. In the case of ransomware, the remediation can include decrypting the encrypted files and/or transporting the encrypted files to the monitoring platform 130 (or to a different cloud-based service). In order to facilitate local decryption, the agent 122 can collect information characterizing the encrypted files. For example, the agent 122 can identify or generate a list of files that were encrypted as well as the key material used in the encryption of each particular file. In order to identify the encrypted files, an algorithm can analyze the file name, extension and contents of a particular file to see if tis encrypted. Key material, in this context, refers to variables needed to create a key which can be dependent on the utilized encryption algorithm. The encryption information can be used to generate and deliver decryptor logic (i.e., logic/code to decrypt encrypted files) in the form of a surveyor transported in the form of a surveyor package. A surveyor can be a standalone component that can be run by the agent 122 in order to extend the functionality of the agent 122. The surveyor, when executed by the agent 122, can cause the encrypted files to be decrypted. In some cases, even if the decryptor logic is the same (i.e., a same encryption technique is used for all files), the key materials for each file might be different.

Figure 2:
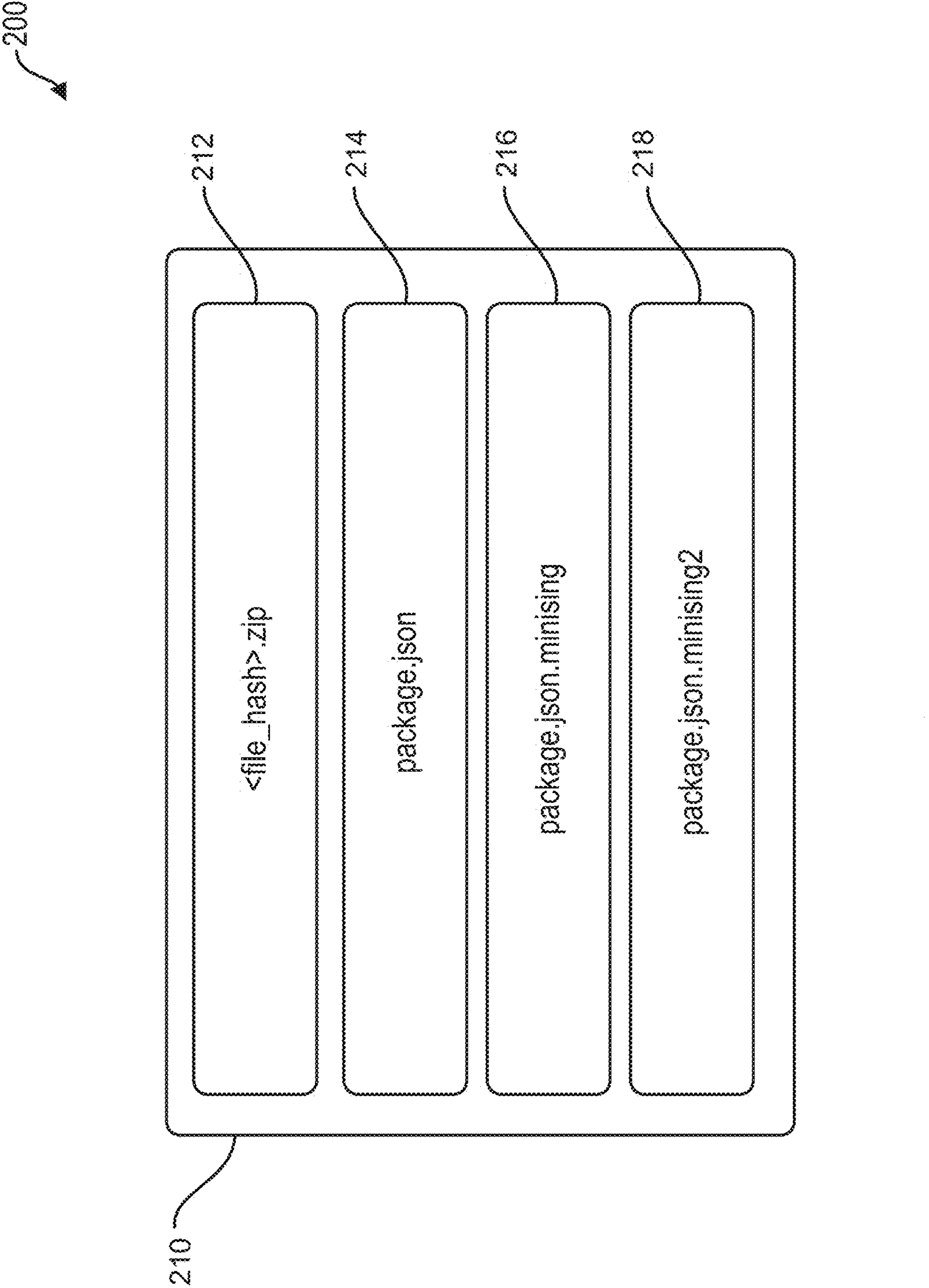
FIG. 2 is a diagram illustrating a surveyor package.

FIG. 2 is a diagram 200 illustrating a surveyor package 210 which can be transmitted by the monitoring platform 130 or from another source via the Internet 110 or the like. The surveyor package 210 can include various subcomponents 212-218 with a main component 212 being an executable (and optionally other related files) for use by an agent 122. In some cases, the surveyor package 210 is specific to or delivered to a particular agent 122. The surveyor package 210 can also include package metadata 214 which can be used to characterize the surveyor package 210 and/or the intended surveyor 210 to which the surveyor package 212 is intended to update. The surveyor package 210 can also include one or more signatures 216, 218 (e.g., cryptographic signatures such as SHA-256, etc.) which can be generated by a build machine which assembles the surveyor package 210 from, for example, source code in a source repository (e.g., Gitlab, etc.).

Figure 3:
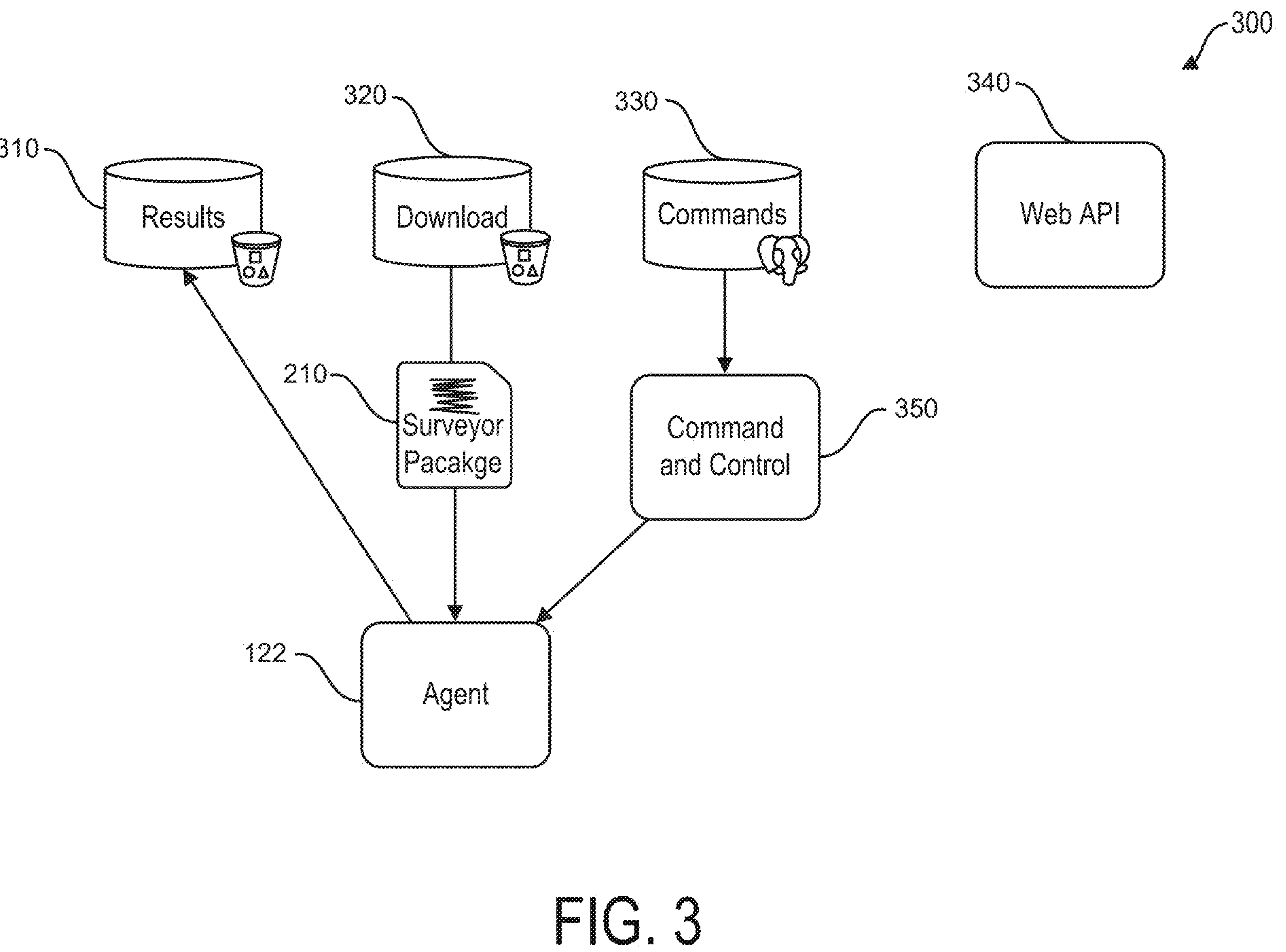
FIG. 3 is a diagram illustrating the deployment of a surveyor package to an agent.

FIG. 3 is a diagram 300 illustrating a surveyor deployment and execution workflow in which a user makes a request by way of a Web API 340 pushes a command 330 to a command and control (C2) server 350 which causes the agent 112 to download the surveyor package 210 identified by the command from a download repository 320. The successful execution of the surveyor package 210 (e.g., the unpacking of the code encapsulated therein, etc.) can then be pushed to a results data store 310 (e.g., cloud storage such as S3, etc.).

Figure 4:
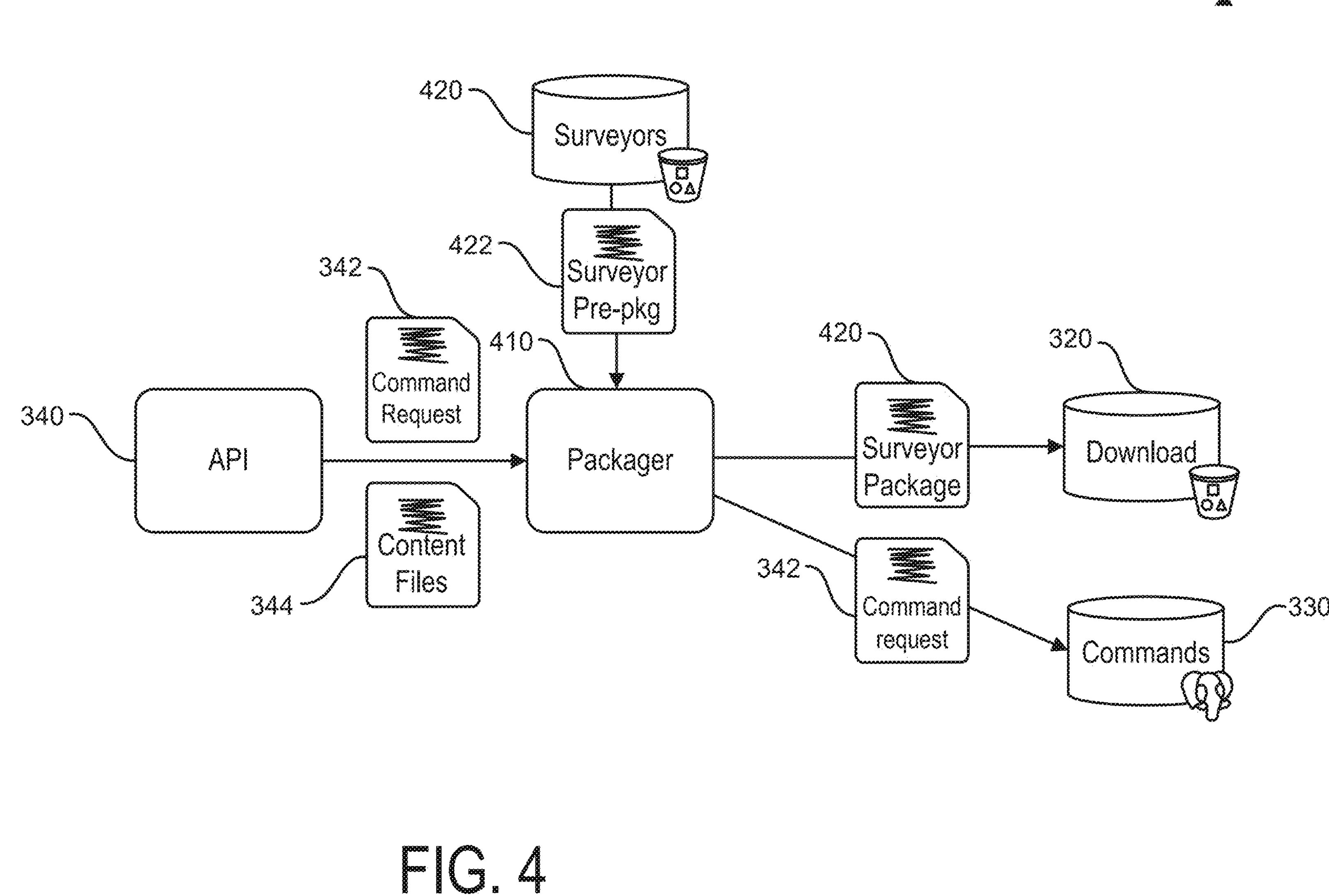
FIG. 4 is a diagram illustrating generation of a surveyor package.

FIG. 4 is a diagram 400 illustrating a workflow for repackaging a surveyor and releasing same. When a user makes a request to the web API 340 to execute a surveyor with content, the request to deploy the surveyor is sent asynchronously to a packager worker 410 which can take the surveyor information 422 (e.g., the executable portion of the surveyor package, etc.) from cloud storage 420. The request includes the command 342 to execute a surveyor as well as content files 344. The content files 344 are files that the surveyor needs to execute. For example, a surveyor can be built and deployed to an agent in order to decrypt Rhysida files. The surveyor is already built for all Rhysida cases; however, in order for the decryptor to work it needs the key materials and the files to decrypt. A first content file 344 can list all the files to decrypt and a second content file 344 can include the key materials for each file, or a single key material for all. The packager worker 410 then, based on the command request 342 and the content files 344 generates a surveyor package 430 which is then made available in the cloud storage 320 for download to a particular endpoint executing an agent. Further, the command request 342 can also be sent to a command store 330 so it can be reused in the future.

Figure 5:
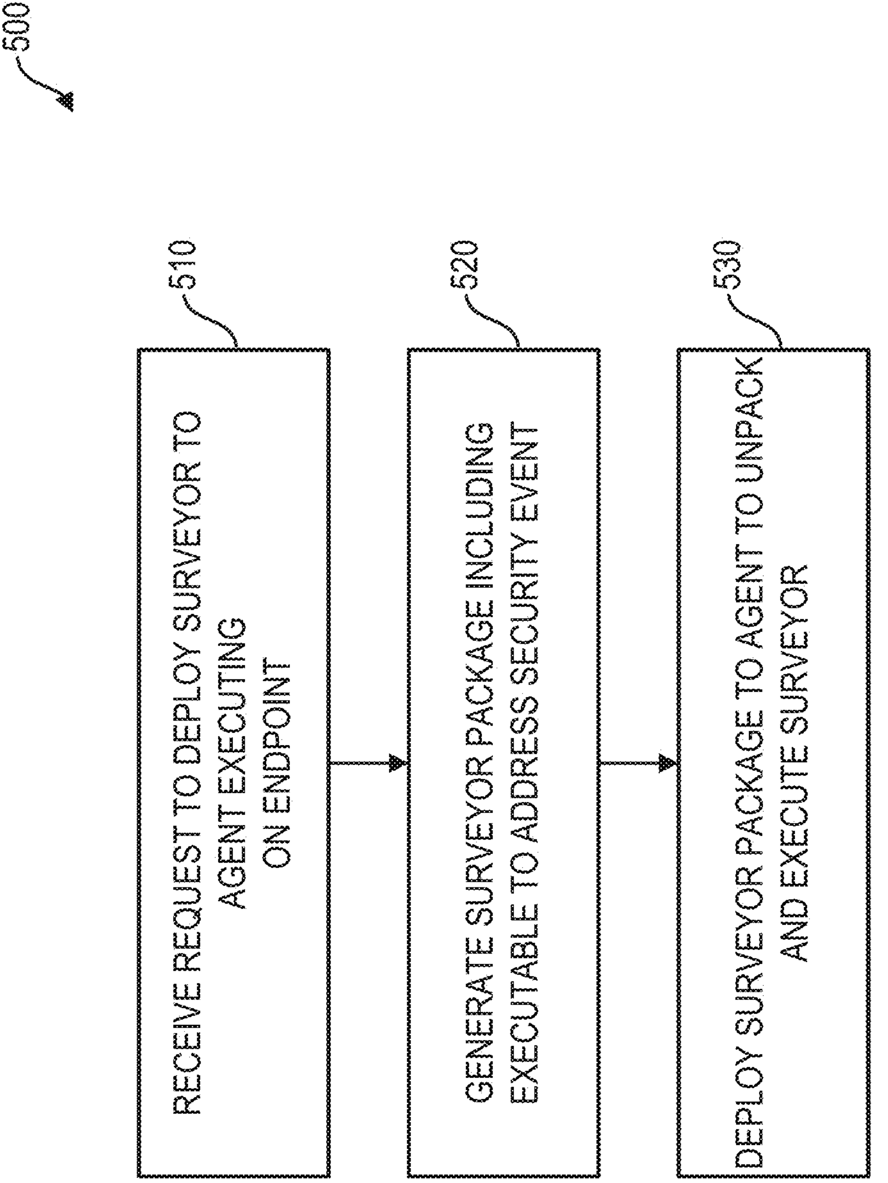
FIG. 5 is a process flow diagram illustrating agent functionality extensions using surveyors.

FIG. 5 is a process flow diagram 500 in which, at 510, a request is received to deploy a surveyor to an agent executing on an endpoint computing device. In response to the request, at 520, a surveyor package is generated which comprises an executable for updating the agent to address a security event and metadata characterizing the surveyor package. Subsequently, at 530, the surveyor package is deployed to the agent which results in the agent unpacking the surveyor package to access and execute the executable.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED, OLED, or LCD screen/monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:

receiving, by an agent executing on an endpoint computing device from a cloud-based monitoring platform, a surveyor package;

unpacking, by the agent, the surveyor package; and executing an executable encapsulated in the surveyor package to address a security event;

wherein:

the surveyor package is generated by the cloud-based monitoring platform in response to a request to deploy a surveyor to an agent-executing on the endpoint computing device;

the request comprises information characterizing (i) a list of encrypted files and (ii) key material used in encrypting each of the files in the list of encrypted files; and the executable comprises decryptor logic to decrypt the files in the list of encrypted files.

2. The method of claim 1, wherein the at least a portion of the files in the list of encrypted files use different key material.

3. The method of claim 1, wherein the files in the list of encrypted files use a same key material.

4. The method of claim 1 further comprising:

generating the decryptor logic based on the list of encrypted files and the key materials used for each of the files in the list of encrypted files.

5. The method of claim 4 further comprising:

generating the executable forming part of the surveyor package based on the generated decryptor logic.

6. The method of claim 1, wherein the security event is a ransomware attack.

7. The method of claim 1 further comprising:

executing, by the agent, the executable to effect one or more decryption processes responsive to the security event using the decryptor logic.

8. The method of claim 1, wherein the encrypted files are stored on the endpoint computing device executing the agent.

9. The method of claim 1, wherein the encrypted files are stored on a second endpoint computing device different than the endpoint computing device executing the agent.

10. A method comprising:

receiving, by an agent executing on an endpoint computing device from a cloud-based monitoring platform, a surveyor package;

unpacking, by the agent, the surveyor package; and executing an executable encapsulated in the surveyor package to address a security event;

wherein:

the cloud-based monitoring platform generates the surveyor package responsive to a request to deploy a surveyor to an agent executing on the endpoint computing device;

the request comprises information characterizing a security event which identifies a plurality of files encrypted as part of a ransomware attack and corresponding key material used during the ransomware attack when encrypting each of the plurality of files, wherein a first key material was used to encrypt a first subset of the identified plurality of files and a second key material different from the first key material was used to encrypt a second subset of the identified plurality of files; and the executable comprises decryptor logic to decrypt at least a portion of the plurality of files.

11. The method of claim 10 further comprising:

transporting, by the agent, the decrypted files to a safe computing environment.

12. The method of claim 11, wherein the encrypted files are stored on the endpoint computing device executing the agent.

13. The method of claim 12, wherein the encrypted files are stored on a second endpoint computing device different than the endpoint computing device executing the agent.

14. The method of claim 11 further comprising:

generating the decryptor logic based on the identified encrypted files and the corresponding key material.

15. A system comprising:

at least one processor; and memory storing instructions which, when executed by the at least one processor, result in operations comprising:

sending a request to deploy a surveyor to an agent executing on an endpoint computing device, the request identifying a security event and including a command to execute a surveyor and content files for the surveyor to execute, a first of the content files being a list of files to decrypt and a second of the content files comprising key materials for the list of files to decrypt;

downloading, by the agent in response to the request received by the cloud-based monitoring system, a surveyor package from a download repository comprising an executable for updating the agent to address the security event and metadata characterizing a surveyor to be updated using the surveyor package, the surveyor package comprising decryptor logic to decrypt the files in the list of files to decrypt;

unpacking, by the agent, the surveyor package; and executing, by the agent, the executable to initiate one or more remediation actions to address the security event.

16. The system of claim 15, wherein the operations further comprise:

generating, by a packager worker based on the request, the surveyor package; and making the surveyor package available in cloud storage for download.

17. The method of claim 15, wherein at least a portion of the files use different key material.

18. The system of claim 15, wherein the operations further comprise:

generating the decryptor logic based on the list of files to decrypt and the key materials used for each of the encrypted files in the list of files to decrypt.

19. The system of claim 18, wherein the operations further comprise:

generating the executable forming part of the surveyor package based on the generated decryptor logic.

20. The system of claim 15, wherein the files in the list of files to decrypt use a same key material.

21. The system of claim 15, wherein the encrypted files are stored on the endpoint computing device executing the agent.

22. The system of claim 15, wherein the encrypted files are stored on a second endpoint computing device different than the endpoint computing device executing the agent.

* * * * *